United States Patent [19]

Sakai et al.

[11] Patent Number: 5,990,219
[45] Date of Patent: Nov. 23, 1999

[54] COLORED METALLIC PAINT COMPOSITIONS AND PAINTED OBJECTS

[75] Inventors: Naoya Sakai, Yokohama; Eiji Fujimori, Tokyo; Shinichi Sakaniwa, Cigasaki; Katsuaki Ishii, Totsuka, all of Japan

[73] Assignee: BASF Coatings AG, Muenster-Hiltrup, Germany

[21] Appl. No.: 09/125,563

[22] PCT Filed: Feb. 10, 1997

[86] PCT No.: PCT/EP97/00608

§ 371 Date: Aug. 31, 1998

§ 102(e) Date: Aug. 31, 1998

[87] PCT Pub. No.: WO97/31983

PCT Pub. Date: Sep. 4, 1997

[30] Foreign Application Priority Data

Feb. 27, 1996 [JP] Japan .................................. 8-040051

[51] Int. Cl.⁶ ............................................................ C08K 3/08
[52] U.S. Cl. ............................................. 524/441; 106/417
[58] Field of Search .............................. 524/441; 106/447

[56] References Cited

U.S. PATENT DOCUMENTS

| 4,598,020 | 7/1986 | Panush . |
| 5,441,564 | 8/1995 | Vogt ........................................ 106/417 |
| 5,476,949 | 12/1995 | Wallquist et al. ...................... 548/453 |

FOREIGN PATENT DOCUMENTS

| 0 388 931 A2 | 3/1990 | European Pat. Off. .......... B05D 5/06 |
| 388931 | 9/1990 | European Pat. Off. . |
| 439107 | 7/1991 | European Pat. Off. . |
| 0 640 603 A1 | 7/1994 | European Pat. Off. ...... C07D 487/04 |
| 42 40 511 A1 | 12/1992 | Germany ........................ C09D 17/00 |
| 4-202477 | 4/1992 | Japan ............................ C08L 101/00 |
| 7-292294 | 7/1995 | Japan ............................... C09D 5/38 |

*Primary Examiner*—David W. Wu
*Assistant Examiner*—Ling-Siu Choi

[57] ABSTRACT

To obtain a colored metallic paint with which a colored metallic paint film which has excellent features and with which a change in color is produced according to differences in the viewing angle can be formed using the usual cheap pigments without compounding special glitter materials. The present invention provides a paint composition which contains, per 100 parts by weight of a film forming binder (A), from 0.1 to 15 parts by weight of metallic powder (B), from 0.1 to 10 parts by weight of a first colored pigment (C) of primary particle size from 0.01 to 0.2 $\mu$m which is selected from among the group comprising the phthalocyanine, perylene, indanthrone, azomethine, benzimidazolone, quinacridone, anthraquinone, diketopyrolopyrrole and dioxazine based pigments, and from 0.5 to 50 parts by weight of a second colored pigment (D) of primary particle size from 0.1 to 2 $\mu$m selected from among the group comprising the diketopyrolopyrrole, quinacridone, pyrazolone, naphthol AS, iron oxide and complex metal oxide based pigments, where the primary particle size of the pigment (C) is relatively smaller than that of the pigment (D), and there is a complementary color relationship between the pigments (C) and (D).

3 Claims, No Drawings

COLORED METALLIC PAINT COMPOSITIONS AND PAINTED OBJECTS

TECHNICAL FIELD OF THE INVENTION

The invention concerns colored metallic paint compositions which can be used ideally in the field of industrial products such as automobiles where novel features are required, and painted objects which have a paint film formed from these compositions.

BACKGROUND OF THE INVENTION

Paint films which have novel features are desirable for providing a beautiful finish on industrial products such as automobiles. For this reason, paint films which give rise to a change in color according to differences in the viewing angle have been obtained in recent years by compounding special glitter materials such as interference mica and iron oxide flakes, and pigment coated aluminum flakes, for example, in paints.

For example, a resin composition with which it is possible to form paint films which have excellent flip-flop characteristics by compounding mica-like aluminum solid solution red iron oxide has been disclosed in Japanese Patent Kokai H4-202477. Furthermore, a color flip-flop metallic paint in which a plurality of types of glittering colored metal pigments which have different colors, or glittering colored metal pigments and organic pigments which have different colors, are compounded and with which paint film s which have excellent color flip-flop characteristics can be formed has been disclosed in Japanese Patent Kokai H7-292294.

However, special glitter materials such as those referred to above are expensive and, moreover, some of the glitter materials have a high specific gravity and so they are liable to settle out and there is a problem in that the operability when painting is poor.

The purpose of this invention is to provide colored metallic paint compositions for resolving these problems in which no special glitter material is compounded, in which the cheap pigments generally used in the past are used, with which changes in color are produced according to differences in the viewing angle, and with which it is therefore possible to form cheaply colored metallic paint films which have excellent features.

A further aim of the invention is to provide painted objects which have a paint film which has excellent features which has been formed with the aforementioned colored metallic paint compositions.

SUMMARY OF THE INVENTION

The invention provides the following colored metallic paint compositions and painted objects. (1) Colored metallic paint, which comprises a paint composition which contains, per 100 parts by weight of film forming binder (A), from 0.1 to 15 parts by weight of metallic powder (B), from 0.1 to 10 parts by weight of a first colored pigment (C) of primary particle size from 0.01 to 0.2 µm selected from among the group comprising the phthalocyanine, perylene, indanthrone, azomethine, benzimidazolone, quinacridone, anthraquinone, diketopyrolopyrrole and dioxazine based colored pigments, and from 0.5 to 50 parts by weight of a second colored pigment (D) of primary particle size from 0.1 to 2 µm selected from among the group comprising the diketopyrolopyrrole, quinacridone, pyrazolone, naphthol AS, iron oxide and complex metal oxide based colored pigments, wherein the primary particle size of the first colored pigment (C) is relatively smaller than that of the primary particle size of the second colored pigment (D), and the first colored pigment (C) and the second colored pigment (D) have a complementary color relationship. (2) Painted object, which comprises a colored metallic paint film formed from a colored metallic paint composition as disclosed in 1 above.

DETAILED DESCRIPTION OF THE INVENTION

The film forming binder (A) which is used in the invention is a material in which the metallic powder (B), the first colored pigment (C) and the second colored pigment (D) are dispersed and which forms the paint film, and no particular limitation is imposed upon the type of binder and it can be a known resin for paint purposes. The thermoset resins where a crosslinking agent such as an amino resin or an isocyanate compound (including blocked materials) for example are mixed, as required with a base resin, such as an acrylic resin, polyester resin, alkyd resin, silicon resin or fluorine based resin, for example, can be cited as preferred resins for use as such a film forming binder (A), but other resins for paint purposes, such as the two-liquid type polyurethane resins and two-liquid type silicon resins, for example, which dry or cure at normal temperature can also be used. These film forming binder (A) components can be used individually, or they can be used in combinations of two or more types.

The known flat particles which are orientated in a paint for imparting a metallic appearance to the paint film can be used for the metallic powder (B) which is used in the invention. Actual examples of the metallic powder (B) include metal flakes such as aluminum flakes, nickel flakes, stainless steel flakes and titanium flakes. The aluminum flakes in particular from among these materials are desirable as a cheap material. Commercially available products can also be used for the metallic powder (B), and examples of such materials include Alpaste 7130N, 7160N and 7770N manufactured by the Toyo Aluminum Co. and Sap510N and Sap 561PS (both trademarks) manufactured by the Showa Aluminum Powder Co., and these can be procured easily. One type of metallic powder (B) can be used individually, or a combination of two or more types can be used.

The amount of metallic powder (B) compounded is from 0.1 to 15 parts by weight, and preferably from 1 to 10 parts by weight, per 100 parts by weight of the film forming binder (A). If the amount of metallic powder (B) compounded is less than 0.1 part by weight then a metallic appearance is not obtained with the paint film, and if the amount compounded exceeds 15 parts by weight then there is much protrusion of the particles at the paint film surface and the smoothness of the paint film surface is reduced.

The first colored pigment (C) which is used in the invention is a colored organic pigment selected from among the group comprising the phthalocyanine, perylene, indanthrone, azomethine, benzimidazolone, quinacridone, anthraquinone, diketopyrolopyrrole and dioxazine based colored pigments. The primary particle size of the first colored pigment (C) is from 0.01 to 0.2 µm. No particular limitation is imposed upon the form of the particles, and needle-shaped, spherical and rectangular parallelopiped forms, for example, can be used.

Materials which have a great coloring power are preferred for the first colored pigment (C), and examples include phthalocyanine based colored pigments such as phthalocyanine green and phthalocyanine blue; perylene based colored pigments such as perylene red and perylene maroon; indanthrone based colored pigments such as indanthrone blue; azomethine based colored pigments such as azomethine yellow; benzimidazolone based colored pigments such as benzimidazolone yellow and benzimidazolone orange; quinacridone based colored pigments such as quinacridone red and quinacridone magenta; anthraquinone based colored pigments such as anthraquinone red; diketopyrolopyrrole based colored pigments such as diketopyrolopyrrole red; and dioxazine based colored pigments such as dioxazine violet, and these can be procured easily.

One type of first colored pigment (C) can be used individually, or a combination of two or more types can be used.

The amount of the first colored pigment (C) compounded is from 0.1 to 10 parts by weight, and preferably from 1 to 5 parts by weight, per 100 parts by weight of the film forming binder (A). If the amount of the first colored pigment (C) compounded is less than 0.1 part by weight then coloration is not observed in the highlight regions of the paint film, and if the amount compounded exceeds 10 parts by weight then no change in color is observed due to the fact that the color of the first colored pigment (C) predominates.

The second colored pigment (D) which is used in the invention is a colored organic pigment selected from among the group comprising the diketopyrolopyrrole, quinacridone, pyrazolone, naphthol AS, iron oxide and complex metal oxide based colored pigments. The primary particle size of the second colored pigment (D) is from 0.1 to 2 µm. No particular limitation is imposed upon the form of the particles, and needle-shaped, spherical and rectangular parallelopiped forms, for example, can be used.

Materials which have a great coloring power are preferred for the second colored pigment (D), and examples include diketopyrolopyrrole based colored pigments such as diketopyrolopyrrole red; quinacridone based colored pigments such as quinacridone red and quinacridone magenta, pyrazolone based colored pigments such as pyrazolone red and pyrazolone orange; naphthol AS based colored pigments such as naphthol AS red; iron oxide based colored pigments such as iron oxide red; and composite metal oxide based colored pigments such as composite inorganic oxide yellow and baked pigment, and these can be procured easily.

One type of second colored pigment (D) can be used individually, or a combination of two or more types can be used.

The amount of the second colored pigment (D) compounded is from 0.5 to 50 parts by weight, and preferably from 1 to 10 parts by weight, per 100 parts by weight of the film forming binder (A). If the amount of the second colored pigment (D) compounded is less than 0.5 parts by weight then coloration of the shade part is not observed in the paint film, and if the amount compounded exceeds 50 parts by weight then no change in color is observed due to the fact that the color of the second colored pigment (D) predominates.

When the first colored pigment (C) and the second colored pigment (D) are combined and used in this invention, the first colored pigment (C) has a relatively smaller particle size than the second colored pigment (D), and the use of one which is at least 0.01 µm smaller is desirable. Furthermore, colored pigments which have a complementary color relationship are used in combination for the two components.

Thus, the combinations which can be used are those where, for example, when the hue of the first colored pigment (C) in the JIS color "representation of colors with three attributes" is 5R, the hue of the second colored pigment (D) is a hue within the range from 5GY to 5PB on the complementary color side, and when the hue of the first colored pigment (C) is 10B, for example, the hue of the second colored pigment (D) is a hue within the range from 10RP to 10GY on the complementary color side.

In this invention, by using a combination where the primary particle sizes of the first colored pigment (C) and the second colored pigment (D) are within the aforementioned ranges, and the primary particle size of the first colored pigment is made relatively smaller, the first colored pigment (C) transmits the incident light relatively easily and has the effect mainly of coloring the highlight regions (direct reflection) of the metallic paint film, and the second colored pigment (D) scatters the incident light relatively easily and has the effect mainly of coloring the shade parts (scatter reflection) of the metallic paint film. Since these two have a complementary color relationship, the colors exhibited in the highlight and shade parts of the metallic paint film have different hues, and a change in color is produced according to differences in the viewing angle, and a metallic paint film which has excellent features is obtained.

In addition to the aforementioned essential components (A) to (D), the additives which have been compounded in paints in the past, such as glitter materials, for example iron oxide flakes of which the primary particle size is outside the range of this invention, special glitter materials such as pigment coated aluminum flakes, mica pigments, other colorless pigments, levelling agents, viscosity adjusting agents, pigment dispersants, anti-run agents, ultraviolet absorbers, light stabilizers, thermal stabilizers, curing catalysts and radical scavengers, for example, can be compounded, as required, in a paint composition of this invention in amounts such that the aims of the invention are not adversely affected.

The paint compositions of this invention are obtained by mixing the essential components (A) to (D) and the other additives which are compounded, as required, and forming a uniform dispersion, but generally the first pigment (C) and the second pigment (D) are procured in the form of aggregated secondary particles and so when preparing the pigments the secondary particles are uniformly reduced to fine particles as close as possible to the primary particles. For example, the particles are dispersed in the binder using a pigment dispersing machine such as mortar mill.

The form of a paint composition of this invention is generally of the organic solvent type, but it is not limited to such a form and it may take a water-free liquid dispersion form, an aqueous solution form, an aqueous liquid dispersion form, a solvent-free form or a powder form, for example.

No particular limitation is imposed upon the material which is to be painted with a paint composition of this invention, and it may be, for example, iron, steel, aluminum, zinc or an alloy of these materials, a metal which has been subjected to surface treatment such as iron phosphate treatment, a zinc phosphate treatment or a chromate treatment, a plastic such as polyurethane, polypropylene and polycarbonate or wood. Undercoat paints and middle-coat paints, for example, can be painted onto these materials which are to be painted.

The two-coat one-bake painting used when painting automobiles can be cited as an example of painting with a paint composition of this invention. In this case, the paint composition of this invention is used as the base coat of the top-coat paint. Generally it is desirable to paint on and harden the known primers such as the electrodeposition type paints and thermoset middle-coat paints as used conventionally and then to paint on the composition of this invention. The use of an atomizing type painting machine for painting is desirable, and painting can be carried out using the usual methods, for example with an electrostatic painting machine or by spray painting. The paint viscosity during painting is adjusted to within the range of from 10 to 30 seconds, and preferably from 11 to 18 seconds (20° C.) with a #4 Ford Cup and, in general, the painted film thickness, based on the hardened film thickness, is suitably within the range from 5 to 30 µm, and preferably within the range from 8 to 25 µm.

Then, while the painted film is uncured or undried, or after it has been cured or dried, a clear paint is painted on. As a result of painting in this way it is possible to obtain a colored metallic paint film which has a gloss and which has excellent features in that the color changes according to differences in the viewing angle.

The painted objects of this invention have colored metallic paint films formed from the aforementioned colored paint compositions on the aforementioned objects to be painted. Painted objects of this type have excellent features and so they can be used in fields such as automobile bodies and parts; domestic products such as refrigerators, washing machines and air conditioning units; roadway supplies such as poles, sound deadening walls and guard rails; building materials such as the interior and exterior walls of buildings, pillars, roofs and partitions; electrical and communication devices such as telephones; metal products such as pipes, couplings, metal machines, trash cans, small object containers, steel domestic appliances, steel tables, and steel, zinc plated steel, stainless steel and aluminum drinks cans; glass, wood, plaster board, plastics and printed materials and colored materials.

The colored metallic paint compositions of this invention have two types of colored pigment which have specified primary particle sizes and which have a complementary color relationship compounded in specified amounts and so it is possible to achieve a change in color depending on the viewing angle using cheap pigments which are easily procured which have been in general use in the past and without compounding special glitter materials and, as a result, it is possible to form cheaply colored metallic paint films which have excellent features.

The painted objects of this invention have colored metallic paint films which have been formed from the aforementioned paint compositions and so they have excellent features and have an effect of the beautiful appearance of industrial products such as automobiles.

The invention is described in more detail below by means of illustrative examples, but the invention is not limited in any way by these examples. Example of Manufacture 1

The colored metallic base coat paints T1 to T11 were manufactured in the way described below with the compositions shown in Tables 1 to 3. Thus, the colored metallic base coat paints T1 to T11 were prepared by dispersing the pigments using a dispersing machine and then mixing the various components uniformly and adjusting to a viscosity of 14 seconds (Ford Cup #4/20° C.) using a mixed organic solvent comprising 25 parts by weight toluene, 30 parts by weight xylene, 15 parts by weight butyl acetate and 10 parts by weight butanol.

TABLE 1

| | | | (Units: Parts by Weight) Type of Paint | | | |
|---|---|---|---|---|---|---|
| | | | T1 | T2 | T3 | T4 |
| Film Forming Binder (A) | Acrylic resin | *1 | 70 | 70 | 70 | 70 |
| | Melamine resin | *2 | 28 | 28 | 28 | 28 |
| | CAB Resin | *3 | 2 | 2 | 2 | 2 |
| Metallic Powder (B) | Aluminum paste | *4 | 6 | 10 | 5 | 8 |
| First Colored Pigment (C) | Phthalocyanine Blue | *5 | 1 | — | 1 | 1 |
| | Perylene Red | *6 | — | 1 | — | — |
| Second Colored Pigment (D) | Diketopyrolo-pyrrole Red | *7 | 1 | — | 1 | — |
| | Iron Oxide Red | *8 | — | — | — | 1 |
| | Baked pigment | *9 | — | 8 | — | — |

TABLE 1-continued

| | | | (Units: Parts by Weight) Type of Paint | | | |
|---|---|---|---|---|---|---|
| | | | T1 | T2 | T3 | T4 |
| Other Components | Carbon Black | *10 | — | — | 1 | — |
| Complementary Color Relationship Between Components (C) and (D) | | | Yes | Yes | Yes | Yes |

Notes Relating to Tables 1 to 3
*1 Acrylic Resin: "Acrydic 44-179" (trademark, manufactured by the Dainippon Ink Kagaku Kogyo Co.)
*2 Melamine Resin: "Super Bekkamin L-177-60" (trademark, manufactured by the Dainippon Ink Kagaku Kogyo Co.)
*3 CAB Resin: "CAB381-0.5" (trademark, a cellulose acetate butyrate resin, manufactured by the Eastman Chemical Co.)
*4 Aluminum Paste: "Alupaste 7770N" (trademark, average particle size 12 μm, manufactured by the Toyo Aluminum Co.)
*5 Phthalocyanine Blue: "Cyanine Blue G314" (trademark, primary particle size 0.05 μm, hue 10B, manufactured by the Sanyo Shikiso Co.)
*6 Perylene Red: "Perylene Red R6436", trademark, primary particle size 0.05 μm, hue 2.5R, manufactured by the Bayer Co.)
*7 Diketopyrolopyrrole Red: "Irgazine DPP Red BO" (trademark, primary particle size 0.5 μm, hue 1.25R, manufactured by the Ciba Geigy Co.)
*8 Iron Oxide Red: "Todacolor 120ED" (trademark, primary particle size 0.14 μm, hue 7.5R, manufactured by the Toda Kogyo Co.)
*9 Baked Pigment: "Daiperozide Green 9320" (trademark, primary particle size 1.1 μm, hue 5G, manufactured by the Ohi Seika Co.)
*10 Carbon Black: "FW200" (trademark, manufactured by the Degusa Co.)

TABLE 2

| | | | (Units: Parts by Weight) Type of Paint | | | |
|---|---|---|---|---|---|---|
| | | | T5 | T6 | T7 | T8 |
| Film Forming Binder (A) | Acrylic resin | *1 | 70 | 70 | 70 | 70 |
| | Melamine resin | *2 | 28 | 28 | 28 | 28 |
| | CAB Resin | *3 | 2 | 2 | 2 | 2 |
| Metallic Powder (B) | Aluminum paste | *4 | 0.08 | 17 | 5 | 6 |
| First Colored Pigment (C) | Phthalocyanine Blue | *5 | — | 1 | — | — |
| | Perylene Red | *6 | — | — | 0.05 | 1 |
| Second Colored Pigment (D) | Diketopyrolo-pyrrole Red | *7 | — | 1 | — | — |
| | Iron Oxide Red | *8 | — | — | — | — |
| | Baked pigment | *9 | — | — | 8 | 55 |
| Other Components | Carbon Black | *10 | 2 | — | — | — |
| Complementary Color Relationship Between Components (C) and (D) | | | Yes | Yes | Yes | Yes |

Notes Relating to Tables 1 to 3
*1 Acrylic Resin: "Acrydic 44-179" (trademark, manufactured by the Dainippon Ink Kagaku Kogyo Co.)
*2 Melamine Resin: "Super Bekkamin L-177-60" (trademark, manufactured by the Dainippon Ink Kagaku Kogyo Co.)
*3 CAB Resin: "CAB381-0.5" (trademark, a cellulose acetate butyrate resin, manufactured by the Eastman Chemical Co.)
*4 Aluminum Paste: "Alupaste 7770N" (trademark, average particle size 12 μm, manufactured by the Toyo Aluminum Co.)
*5 Phthalocyanine Blue: "Cyanine Blue G314" (trademark, primary particle size 0.05 μm, hue 10B, manufactured by the Sanyo Shikiso Co.)
*6 Perylene Red: "Perylene Red R6436", trademark, primary particle size 0.05 μm, hue 2.5R, manufactured by the Bayer Co.)
*7 Diketopyrolopyrrole Red: "Irgazine DPP Red BO" (trademark, primary particle size 0.5 μm, hue 1.25R, manufactured by the Ciba Geigy Co.)
*8 Iron Oxide Red: "Todacolor 120ED" (trademark, primary particle size 0.14 μm, hue 7.5R, manufactured by the Toda Kogyo Co.)
*9 Baked Pigment: "Daiperozide Green 9320" (trademark, primary particle size 1.1 μm, hue 5G, manufactured by the Ohi Seika Co.)
*10 Carbon Black: "FW200" (trademark, manufactured by the Degusa Co.)

TABLE 3

(Units: Parts by Weight)

| | | | Type of Paint | | |
|---|---|---|---|---|---|
| | | | T9 | T10 | T11 |
| Film Forming Binder (A) | Acrylic resin | *1 | 70 | 70 | 70 |
| | Melamine resin | *2 | 28 | 28 | 28 |
| | CAB Resin | *3 | 2 | 2 | 2 |
| Metallic Powder (B) | Aluminum paste | *4 | 7 | 8 | 6 |
| First Colored Pigment (C) | Phthalocyanine Blue | *5 | 1 | 15 | — |
| | Perylene Red | *6 | — | — | 1 |
| Second Colored Pigment (D) | Diketopyrolo-pyrrole Red | *7 | — | — | — |
| | Iron Oxide Red | *8 | 0.1 | 1 | 1 |
| | Baked pigment | *9 | — | — | — |
| Other Components | Carbon Black | *10 | — | — | — |
| Complementary Color Relationship Between Components (C) and (D) | | | Yes | Yes | No |

Notes Relating to Tables 1 to 3
*1 Acrylic Resin: "Acrydic 44-179" (trademark, manufactured by the Dainippon Ink Kagaku Kogyo Co.)
*2 Melamine Resin: "Super Bekkamin L-177-60" (trademark, manufactured by the Dainippon Ink Kagaku Kogyo Co.)
*3 CAB Resin: "CAB381-0.5" (trademark, a cellulose acetate butyrate resin, manufactured by the Eastman Chemical Co.)
*4 Aluminum Paste: "Alupaste 7770N" (trademark, average particle size 12 μm, manufactured by the Toyo Aluminum Co.)
*5 Phthalocyanine Blue: "Cyanine Blue G314" (trademark, primary particle size 0.05 μm, hue 10B, manufactured by the Sanyo Shikiso Co.)
*6 Perylene Red: "Perylene Red R6436", trademark, primary particle size 0.05 μm, hue 2.5R, manufactured by the Bayer Co.)
*7 Diketopyrolopyrrole Red: "Irgazine DPP Red BO" (trademark, primary particle size 0.5 μm, hue 1.25R, manufactured by the Ciba Geigy Co.)
*8 Iron Oxide Red: "Todacolor 120ED" (trademark, primary particle size 0.14 μm, hue 7.5R, manufactured by the Toda Kogyo Co.)
*9 Baked Pigment: "Daiperozide Green 9320" (trademark, primary particle size 1.1 μm, hue 5G, manufactured by the Ohi Seika Co.)
*10 Carbon Black: "FW200" (trademark, manufactured by the Degusa Co.)

Notes Relating to Tables 1 to 3

1 Acrylic Resin: "Acrydic 44-179" (trademark, manufactured by the Dainippon Ink Kagaku Kogyo Co.)
2 Melamine Resin: "Super Bekkamin L-177-60" (trademark, manufactured by the Dainippon Ink Kagaku Kogyo Co.)
3 CAB Resin: "CAB381-0.5" (trademark, a cellulose acetate butyrate resin, manufactured by the Eastman Chemical Co.)
4 Aluminum Paste: "Alupaste 7770N " (trademark, average particle size 12 μm, manufactured by the Toyo Aluminum Co.)
5 Phthalocyanine Blue: "Cyanine Blue G314" (trademark, primary particle size 0.05 μm, hue 10B, manufactured by the Sanyo Shikiso Co.)
6 Perylene Red: "Perylene Red R6436", trademark, primary particle size 0.05 μm, hue 2.5R, manufactured by the Bayer Co.)
7 Diketopyrolopyrrole Red: "Irgazine DPP Red BO" (trademark, primary particle size 0.5 μm, hue 1.25R, manufactured by the Ciba Geigy Co.)
8 Iron Oxide Red: "Todacolor 120ED" (trademark, primary particle size 0.14 μm, hue 7.5R, manufactured by the Toda Kogyo Co.)
9 Baked Pigment: "Daiperozide Green 9320" (trademark, primary particle size 1.1 μm, hue 5G, manufactured by the Ohi Seika Co.)
10 Carbon Black: "FW200" (trademark, manufactured by the Degusa Co.)

EXAMPLES 1 to 4 AND COMPARATIVE EXAMPLES 1 to 7

A cationic electrodeposition paint [AquaNO. 4200, trademark, manufactured by the Nippon Yushi Co.] was electro-deposition pained to a dry film thickness of about 20 μm on steel sheets which had been subjected to a zinc phosphate treatment and, after being baked at 170° C. for 20 minutes, a middle coat paint for automobile purposes [Hyepico No. 1 CP Sealer, trademark, manufactured by the Nippon Yushi Co.] was spray painted to provide a dry film thickness of about 30 μm and baked at 140° C. for 30 minutes to provide the test sheets.

The colored metallic base coat paints indicated in Tables 4 and 5 and the clear paint described below were spray painted onto the test sheet under the film thickness conditions shown in Tables 4 and 5 and then baked at 140° C. for 30 minutes. The change in color with the viewing angle and the finished appearance of the paint films obtained were evaluated. The results are shown in Tables 4 and 5.

An organic solvent type heat curing paint which had a film forming binder component comprising 140 parts by weight acrylic resin ["Acrydic 44-179", trademark, manufactured by the Dainippon Ink Kagaku Kogyo Co.] and 50 parts by weight butylated melamine resin ["Super Bekkamin L-117-60", trademark, manufactured by the Dainippon Ink Kagaku Kogyo] as the main component was used for the aforementioned clear paint.

TABLE 4

| | | Example | | | |
|---|---|---|---|---|---|
| | | 1 | 2 | 3 | 4 |
| Type of colored metallic base coat paint | *1 | T1 | T2 | T3 | T4 |
| Base coat film thickness | | 15 | 15 | 15 | 15 |
| Clear film thickness | | 35 | 35 | 35 | 35 |
| Change of color with the viewing angle | *2 | ○ | ○ | ○ | ○ |
| Finished appearance | *3 | ○ | ○ | ○ | ○ |

Notes Relating to Table 4 and 5
*1 See Tables 1 to 3.
*2 Change of color with the viewing angle: Whether or not a change in color was observed with different viewing angles of the completed paint film was observed and evaluated.
○: Change in color with different viewing angles.
Δ: Some change in color with different viewing angles.
X: No change in color with different viewing angles.
*3 Finished appearance: Whether or not the completed paint film had brilliance was observed and evaluated.
o: Brilliant
Δ: Poor brilliance
x: Dulled gloss

TABLE 5

| | | Comparative Example | | | | | | |
|---|---|---|---|---|---|---|---|---|
| | | 1 | 2 | 3 | 4 | 5 | 6 | 7 |
| Type of colored metallic base coat paint | *1 | T5 | T6 | T7 | T8 | T9 | T10 | T11 |
| Base coat film thickness | | 15 | 15 | 15 | 15 | 15 | 15 | 15 |
| Clear film thickness | | 35 | 35 | 35 | 35 | 35 | 35 | 35 |
| Change of color with the viewing angle | *2 | X | X | X | X | X | X | X |

TABLE 5-continued

|  | | Comparative Example | | | | | | |
|---|---|---|---|---|---|---|---|---|
|  | | 1 | 2 | 3 | 4 | 5 | 6 | 7 |
| Finished appearance | *3 | ○ | X | ○ | Δ | ○ | ○ | ○ |

Notes Relating to Table 4 and 5
*1 See Tables 1 to 3.
*2 Change of color with the viewing angle: Whether or not a change in color was observed with different viewing angles of the completed paint film was observed and evaluated.
○: Change in color with different viewing angles.
Δ: Some change in color with different viewing angles.
X: No change in color with different viewing angles.
*3 Finished appearance: Whether or not the completed paint film had brilliance was observed and evaluated.
o: Brilliant
Δ: Poor brilliance
x: Dulled gloss As is clear from the results shown in Tables 4 and 5, the paint films formed from the paints in Examples 1 to 4 all exhibited a change in color according to differences in the viewing angle.

On the other hand, Comparative Example 1 was a case where the amount of metallic powder (B) was less than 0.1 part by weight per 100 parts by weight of the film forming binder (A), and a metallic appearance was not obtained and neither was a change in color observed according to differences in the viewing angle.

Comparative Example 2 was a case where the amount of metallic powder (B) was more than 15 parts by weight per 100 parts by weight of the film forming binder (A), and there was much protrusion of particles at the paint film surface and the smoothness of the paint film surface was reduced, and a dulling of the gloss occurred.

Comparative Example 3 was a case where the amount of the first colored pigment (C) was less than 0.1 part by weight per 100 parts by weight of the film forming binder (A), and the coloration in the vicinity of the highlights was inadequate and no change in color was observed according to differences in the viewing angle.

Comparative Example 4 was a case where the amount of the second colored pigment (D) was more than 50 parts by weight per 100 parts by weight of the film forming binder (A), and no change in color was observed since the color of the second colored pigment (D) predominated.

Comparative Example 5 was a case where the amount of the second colored pigment (D) was less than 0.5 parts by weight per 100 parts by weight of the film forming binder (A), and the coloration of the shaded parts was inadequate and no change in color was observed according to differences in the viewing angle.

Comparative Example 6 was a case where the amount of the first colored pigment (C) was more than 10 parts by weight per 100 parts by weight of the film forming binder (A), and no change in color was observed since the color of the first colored pigment (C) predominated.

In Comparative Example 7, the hue of the second colored pigment (D) was 7.5R when the hue of the first colored pigment (C) was 2.5R and no change in color was observed since the hue was not within the range from 5GY to 5PB on the complementary color side.

We claim:

1. A colored metallic paint composition comprising:

a film forming binder (A), from 0.1 to 15 parts by weight of metallic powder (B), from 0.1 to 10 parts by weight of a first colored pigment (C) having a primary particle size from 0.01 to 0.2 $\mu$m and selected from the group consisting of phthalocyanine, perylene, indanthrone, azomethine, benzimidazolone, quinacridone, anthra-quinone, diketopyrolopyrrole, dioxazine based colored pigments, and mixtures thereof, and from 0.5 to 50 parts by weight of a second colored pigment (D) having a primary particle size from 0.1 to 2 $\mu$m and selected from the group consisting of diketopyrolopyrrole, quinacridone, pyrazolone, naphthol AS, iron oxide, complex metal oxide based colored pigments, and mixtures thereof, wherein the primary particle size of the first colored pigment (C) is smaller than the primary particle size of the second colored pigment (D), and the first colored pigment (C) and the second colored pigment (D) have a complementary color relationship.

2. The colored metallic paint composition of claim 1, comprising first colored pigment (C) having a primary particle size which is at least 0.01 $\mu$m less than the primary particle size of second colored pigment (D).

3. A painted object, comprising a colored metallic paint film formed from the colored metallic paint composition of claim 1.

* * * * *